United States Patent [19]

Finke et al.

[11] Patent Number: 4,968,737
[45] Date of Patent: Nov. 6, 1990

[54] MOLDING COMPOUNDS COMPRISING A THERMOPLASTICALLY PROCESSIBLE AROMATIC POLYAMIDE

[75] Inventors: Juergen Finke, Marl; Martin Bartmann, Recklinghausen; Friedrich-Georg Schmidt, Muenster, all of Fed. Rep. of Germany

[73] Assignee: Huels Aktiengesellschaft, Marl, Fed. Rep. of Germany

[21] Appl. No.: 315,854

[22] Filed: Feb. 27, 1989

[30] Foreign Application Priority Data

Mar. 3, 1988 [DE] Fed. Rep. of Germany ....... 3806836

[51] Int. Cl.$^5$ .......................... C08K 5/43; C08L 77/10
[52] U.S. Cl. ................................... 524/168; 524/169; 524/606; 524/723
[58] Field of Search ............... 524/168, 169, 606, 743, 524/723; 528/337

[56] References Cited

U.S. PATENT DOCUMENTS 3,554,966  1/1971  Jones et al. ......................... 524/606
4,399,246  8/1983  Hyde ................................... 524/606

FOREIGN PATENT DOCUMENTS 1030344  5/1966  United Kingdom ................ 524/169

Primary Examiner—Lewis T. Jacobs
Attorney, Agent, or Firm—Oblon, Spivak, McClelland, Maier & Neustadt

[57] ABSTRACT

Molding compounds comprising aromatic polyamides which contain from 0.001 to 10% by weight of a low molecular weight sulfonic acid amide display low melt viscosities and an increased resistance to hydrolysis and are thermoplastically processible.

13 Claims, No Drawings

MOLDING COMPOUNDS COMPRISING A THERMOPLASTICALLY PROCESSIBLE AROMATIC POLYAMIDE

BACKGROUND OF THE INVENTION

1. Field of the Invention

The present invention relates to molding compounds comprising a thermoplastically processible aromatic polyamide.

2. Discussion of the Background

Aromatic polyamides prepared from diamines of the general formula

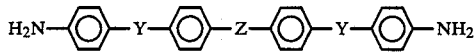

are well-known (see, e.g., DE-OS No. 36 09 011). The melt viscosity of these aromatic polyamides is very high, however. Consequently, very high temperatures must be used in preparing and processing them—in general at least 350° C. At these temperatures the product is degraded, as evidenced by discoloration or degradation of mechanical properties.

Another drawback is the sensitivity of these polyamides with respect to hydrolytic decomposition, which is caused by a high absorption of water. In order to prevent this hydrolysis, additional steps—such as drying—are required during processing.

Thus, there is a need for molding compounds, based on aromatic polyamides, which possess low melt viscosities and high hydrolysis resistances and are free of the above-mentioned disadvantages and are thermoplastically processible.

SUMMARY OF THE INVENTION

Accordingly, one object of the present invention is to provide novel aromatic polyamides which possess low melt viscosities.

Another object of the present invention is to provide novel aromatic polyamides with an increased resistance to hydrolysis.

These and other objects which will become apparent during the following description of the present invention have been achieved by molding compounds which contain a thermoplastically processible aromatic polyamide which is prepared from the following starting materials:

(A) HOOC—Ar—COOH
(B) H₂N—Ar'—NH₂
(C) R—SO₂NH—R' in which starting material (C) is present in an amount of from 0.001 to 10% by weight based on the total weight of starting materials (A) and (B).

DETAILED DESCRIPTION OF THE PREFERRED EMBODIMENTS

The aromatic polyamides of the present invention incorporate the following starting materials:

(A) HOOC—Ar—COOH
(B) H₂N—Ar'—NH₂
(C) R—SO₂NH—R'' where Ar and Ar' represent, independently, 1,3- or 1,4-phenylene; 1,4-, 1,5-, 2,6-, or 2,7-naphthylene;

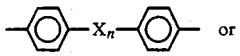

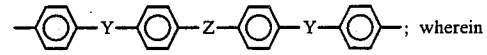

X represents —O—, —S—, —SO₂—, —CO—, or —CR'₂—;
Y represents —O— or —S—;
Z represents —SO₂— or —CO—;
R represents

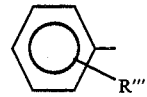

or $C_{1-22}$ alkyl;
R' represents —H or $C_{1-4}$ alkyl;
R'' represents

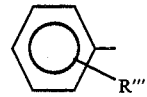

or $C_{1-22}$ alkyl;
R''' represents —H, $C_{1-4}$ alkyl, or a halogen; and
n=0 or 1.

Material (C) is present in the polyamide in the amount of 0.001 to 10% by weight, based on the combined weight of components (A) and (B).

Material (C) is low molecular weight aliphatic, araliphatic, or aromatic sulfonic acid amide. The aromatic group may be substituted by halogen or by $C_{1-4}$ alkyl.

Preferred aliphatic sulfonamides are propanesulfonic acid N-ethylamide, butanesulfonic acid N-butylamide, and butanesulfonic acid N-decylamide.

Preferred araliphatic sulfonamides are benzenesulfonic acid N-methylamide, benzenesulfonic acid N-propylamide, and benzenesulfonic acid N-butylamide.

Preferred aromatic sulfonamides are benzenesulfonic acid N-phenylamide, toluenesulfonic acid N-phenylamide, and chlorobenzenesulfonic acid N-p-tolylamide.

Suitable aromatic dicarboxylic acids for material (A) are isophthalic acid; terephthalic acid; 1,4-, 1,5-, 2,6-, or 2,7-naphthalenedicarboxylic acid; 4,4'-diphenyletherdicarboxylic acid, 4,4'-benzophenonedicarboxylic acid, 4,4'-diphenylsulfonedicarboxylic acid, 2-phenoxyterephthalic acid, and mixtures thereof.

Suitable aromatic diamines for material (B) are, e.g., 4,4'-bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy)benzophenone, 4,4'-bis(p-aminophenylmercapto)benzophenone, 4,4'-bis(p-aminophenylmercapto)diphenylsulfone, and mixtures thereof.

Isophthalic acid, 4,4'-bis(4-aminophenoxy)diphenylsulfone, benzenesulfonic acid N-phenylamide, and benzenesulfonic acid N-butylamide are particularly preferred starting materials.

The molar ratio in which materials (A) and (B) are employed is about 1:1. Material (C) is present in the polyamide in an amount of from 0.001 to 10% by weight, preferably 0.05 to 5% by weight, based on the combined weight of (A) and (B).

The aromatic polyamides of the present invention may be prepared by any conventional process for the production of aromatic polyamides, such as that described in DE-OS No. 36 09 011, which is incorporated herein by reference. The polycondensation is ordinarily carried out in the presence of the sulfonamides of the present invention.

Alternatively, the sulfonamides may be added in a second step, following the polycondensation. This may be done in the polymer melt in any suitable melt mixer or extruder, or in the solid phase by mixing the polymer granulate with the sulfonamide in a tumbling dryer or any other suitable solids mixer, or by applying a solution of the sulfonamide in an organic solvent, e.g., dichloromethane, chloroform, toluene, acetone, or ethanol, to the polyamide granulate and then evaporating the solvent.

To increase the molecular weight, the aromatic polyamides may be subjected to a further polycondensation in the solid phase, in an inert gas atmosphere.

The polyamides of the present invention may be processed to form the present molding compounds by injection molding or extrusion on conventional machines.

The molding compounds of the present invention may also contain fillers, e.g., talcum, or reinforcing agents, e.g., glass fibers, Aramid ® fibers, or carbon fibers, and other conventional additives such as, e.g., pigments or stabilizers.

The molding compounds of the present invention may be formed into molded parts, fibers, films, etc., by conventional methods such as injection molding, extrusion, etc. Similarly, it is possible to use the molding compounds as coating agents, starting with a powder, e.g., using fluidized bed baking, or a liquid dispersion or a solution.

The molding compounds of the present invention have excellent melt viscosities, and they can be processed much more easily than molding compounds containing known aromatic polyamides. In addition, the fact that the present polyamides have a very good resistance to hydrolysis and, therefore, do not require any additional expensive measures to be taken against the effect of moisture during processing is surprising.

Other features of the present invention will become apparent in the course of the following descriptions of exemplary embodiments which are given for illustration of the invention and are not intended to be limiting thereof.

EXAMPLES

The following methods were used to determine the parameters given in the Examples:

The viscosity numbers (J) were determined according to DIN 53 728, using 0.5% by weight solutions of the polymers in a mixture of phenol and o-dichlorobenzene (50:50 by weight) at 25° C.

The melt viscosity index (MVI) values were determined according to DIN 53 735-MFI-B, using a Goettfert viscometer, at 320° C. with a 21.6 kg load.

EXAMPLE 1

21.62 g (0.05 mol) of 4,4'-bis(4-aminophenoxy)diphenylsulfone and 8.31 g (0.05 mol) of isophthalic acid were polymerized in the presence of 82 mg (0.001 mol) of phosphoric acid, 122 mg (0.001 mol) of 4-dimethylaminopyridine, and 1.07 g of benzenesulfonic acid N-butylamide in a flask with a stirrer, a nitrogen inlet, and a distillation bridge, for 20 min. at 250° C., 10 min. at 300° C., and 10 min. at 320° C. In the course of the reaction, the water liberated by the polycondensation was removed by distillation. The viscosity number (J) of the resulting polyamide was determined to be 54 cm$^3$/g (measured in 0.5 wt. % solution in phenol/o-dichlorobenzene). The MVI value was 45 cm$^3$/10 min.

COMPARATIVE EXAMPLE A

Under the conditions used in Example 1, 21.62 g (0.05 mol) of 4,4'-bis(4-aminophenoxy)diphenylsulfone and 8.31 g (0.05 mol) of isophthalic acid were polymerized in the presence of 82 mg (0.001 mol) of phosphoric acid and 122 mg (0.001 mol) of dimethylaminopyridine. The J value for the resulting polyamide was measured as 34 cm$^3$/g. By further condensation in the solid phase at 250° C. the J value was adjusted to 54 cm$^3$/g. The MVI value was 5 cm$^3$/10 min.

EXAMPLE 2

21.62 g (0.05 mol) of 4,4'-bis(4-aminophenoxy)diphenylsulfone, 8.31 g (0.05 mol) of isophthalic acid, and 0.23 g of benzenesulfonic acid N-phenylamide were polymerized analogously to Example 1, in the presence of 122 mg (0.001 mol) of dimethylaminopyridine and 310 mg (0.001 mol) of triphenyl phosphite. After 20 min. at 250° C., 10 min. at 300° C., and 40 min. at 320° C., the resulting polyamide had a J value of 57 cm$^3$/g and a MVI value of 48 cm$^3$/10 min.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molding compound which comprises a thermoplastically processible aromatic polyamide which is prepared from the starting materials:
   (A) HOOC—Ar—COOH
   (B) at least one member selected from the group consisting of 4,4,'-bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy)benzophenone, 4,4,'-bis(p-aminophenylmercapto)benzophenone, and 4,4'-bis(p-aminophenylmercapto)diphenylsulfone
   (C) R—SO$_2$NH—R''
   wherein Ar is one member elected from the group consisting of 1,3-phenylene 1,4-phenylene, 1,4-naphthylene, 1,5-naphthylene, 2,6-naphthylene, 2,7-naphthylene,

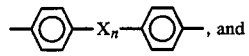, and

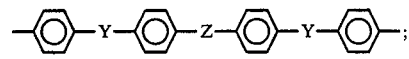;

wherein
X is —O—, —S—, —SO$_2$—, —CO—, or —CR'$_2$—,
Y is —O— or —S—,
Z is —SO$_2$— or —CO—,
R is

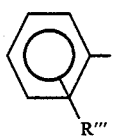

or C$_{1-22}$ alkyl,
R' is —H or C$_{1-4}$ alkyl,
R" is

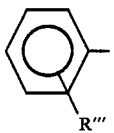

or C$_{1-22}$ alkyl,
R'" is —H, C$_{1-4}$ alkyl, or halogen, and n is 0 or 1, and said material (C) is present in an amount of 0.001 to 10% by weight based on the total weight of said materials (A) and (B).

2. The molding compound of claim 1, wherein Ar is 1,3-phenylene.

3. The molding compound of claim 1, wherein R is

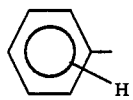

and R" is C$_{1-4}$ alkyl.

4. The molding compound of claim 1, wherein R and R" are each

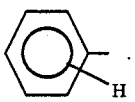

5. The molding compound of claim 1, wherein said material (C) is present in an amount of from 0.50 to 5% by weight based on the total weight of said materials (A) and (B).

6. The molding compound of claim 1, which further comprises one or more members selected from the group consisting of fillers, reinforcers, pigments, and stabilizers.

7. The molding compound of claim 6, wherein said reinforcer is one member selected from the group consisting of glass fibers, aromatic polyamide fibers, and carbon fibers.

8. The molding compound of claim 1, wherein said thermoplastically processible aromatic polyamide is prepared by polymerizing said materials (A) and (B) in the presence of said material (C).

9. The molding compound of claim 1, wherein said thermoplastically processible polyamide is prepared by first polymerizing said materials (A) and (B) and then adding said material (C).

10. The molding compound of claim 1, wherein said material (A) is at least one member selected from the group consisting of isophthalic acid, terephthalic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-diphenyletherdicarboxylic acid, 4,4'-benzophenonedicarboxylic acid, 4,4'-diphenylsulfonedicarboxylic acid, and 2-phenoxyterephthalic acid.

11. The molding compound of claim 1, wherein said material (C) is at least one member selected from the group consisting of propanesulfonic acid N-ethylamide, butanesulfonic acid N-butylamide, butanesulfonic acid N-decylamide, benzenesulfonic acid N-methylamide, benzenesulfonic acid N-propylamide, benzenesulfonic acid N-butylamide, benzenesulfonic acid N-phenylamide, toluenesulfonic acid N-phenylamide, and chlorobenzenesulfonic acid N-p-tolylamide.

12. The molding compound of claim 1, wherein said material (A) is isophthalic acid, said material (B) is 4,4'-bis(4-aminophenoxy)diphenylsulfone, and said material (C) is benzenesulfonic acid N-phenylamide or benzenesulfonic acid N-butylamide.

13. The molding compound of claim 1, wherein said material (B) is 4,4,'-bis(4-aminophenoxy)diphenylsulfone.

* * * * *